United States Patent [19]
Keele et al.

[11] 3,859,856
[45] Jan. 14, 1975

[54] APPARATUS AND METHOD FOR MEASURING A TEMPERATURE

[75] Inventors: Susan Steves Keele; William Keith Ross Watson, both of San Diego, Calif.

[73] Assignee: Kay Laboratories, Inc., San Diego, Calif.

[22] Filed: Feb. 16, 1973

[21] Appl. No.: 333,140

[52] U.S. Cl.................. 73/356, 73/358, 116/114.5
[51] Int. Cl..................... G01k 11/12, G01k 11/06
[58] Field of Search................... 73/358, 356, 17 R; 116/114.5

[56] References Cited
UNITED STATES PATENTS

| | | | |
|---|---|---|---|
| 3,175,401 | 3/1965 | Geldmacher | 116/114.5 |
| 3,465,590 | 9/1969 | Kluth | 73/358 |
| 3,665,770 | 5/1972 | Sagi | 73/356 |
| 3,712,141 | 1/1973 | Chadha | 73/358 |

Primary Examiner—Richard C. Queisser
Assistant Examiner—Denis E. Corr
Attorney, Agent, or Firm—Ellsworth R. Roston

[57] ABSTRACT

A colored backing member provides heat conduction and support for a first chemical or chemicals disposed thereon at a plurality of discrete positions. As the first chemical or chemicals change state at different known temperatures for each of the discrete positions, their visual characteristics also change from opacity to translucence. This transition is particularly apparent since the color of the backing member becomes visible at those discrete positions associated with the translucent first chemicals. Indicia corresponding to the known temperature associated with each of the discrete positions is provided on the backing member. The invention includes a method for maintaining a permanent record of the measured temperature or, alternatively, for recycling the device to measure a subsequent temperature.

32 Claims, 7 Drawing Figures

PATENTED JAN 14 1975
3,859,856
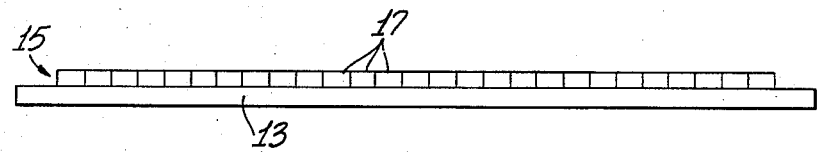
FIG. 2.
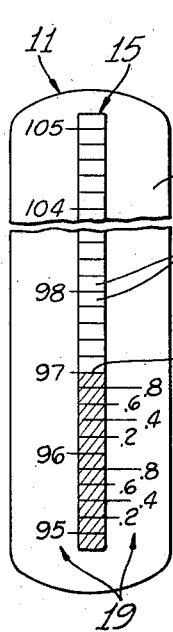
FIG. 1.
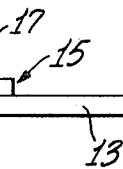
FIG. 3.
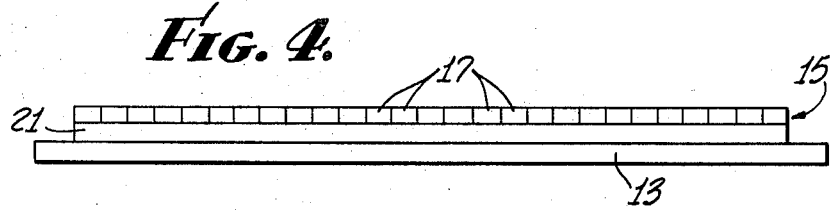
FIG. 4.
FIG. 5.
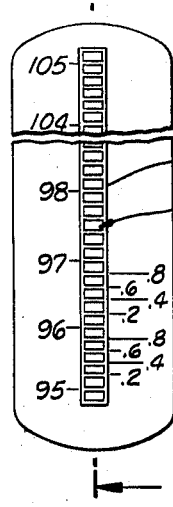
FIG. 6.
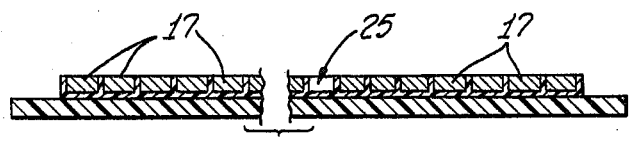
FIG. 7.

APPARATUS AND METHOD FOR MEASURING A TEMPERATURE

BACKGROUND OF THE INVENTION

1. Field of the Invention

This invention relates generally to temperature measuring devices and more specifically to such devices which include chemical means for providing a visual indication of the temperature.

2. Description of the Prior Art

Temperature measuring devices of the prior art have included a backing member and three layers of chemicals disposed in a plurality of dots on the backing member. The layers of chemicals have consisted of first and third layers normally separated by a second layer at each of the dots. The chemicals forming the second layer have had characteristics for melting at a different known temperature at each of the dots. In response to the melting of the chemicals in the second layer, the chemicals in the first and third layers have mixed and reacted to form a different chemical having a particular color.

The backing member has been provided with indicia in proximity to each of the dots which has corresponded to the melting temperature of the chemical in the second layer of the associated dot. With these devices of the prior art, the temperature of an environment, such as the mouth of a patient, has been ascertained by reading the highest number of the indicia corresponding to dots having the particular color.

These devices of the prior art have been used primarily with human beings to measure body temperatures which generally vary within a range between 95° F and 105° F. When these devices have been exposed to atmospheric temperatures within this range, they have reacted by measuring the temperature of the atmosphere. Since the devices have not been recyclable, this previous measurement has generally rendered the devices uselss for subsequently measuring the temperature of a patient. To compound the problem, the devices have often been exposed to atmospheric temperatures above 95° F, particularly when they have been shipped.

For these reasons, the devices have remained disassembled until a time immediately prior to their intended use. This has been accomplished by a relatively complex dispenser which has included a spool of first backing material having the chemicals of the first layer disposed thereon, and a spool of second backing material having the chemicals of the first and second layers disposed thereon. These first and second backing members have been drawn into proximity between rollers inside the dispenser so that the first, second and third layers have formed the matrix of dots.

This process of melting the chemicals in the second layer to produce a reaction between the chemicals in the first and third layers has not been reversible to permit the measuring of a second temperature. Thus, these devices have typically been discarded upon the taking of a single temperature. The expense of providing a three component measuring device, the difficulty and expense associated with providing the dispenser, and the single use provided by these devices have made them generally undesirable for mass use.

SUMMARY OF THE INVENTION

In the present invention, a backing member having a particular color conducts heat to and provides support for a first chemical, portions of which are disposed on the backing member at a plurality of discrete positions. Each of the portions of the first chemical has characteristics for changing state from a solid to a liquid at a different known temperature which can be associated with a different one of the discrete positions. In a preferred embodiment the portions of the first chemical also have visual characteristics including opacity in a solid state and translucence in a liquid state. When the device is exposed to a heated environment, those portions of the first chemical having melting temperatures below the temperature of the environment become translucent so that the particular color of the backing member becomes visible at the associated discrete positions.

A plurality of indicia can be printed or stamped on the backing member each in proximity to one of the discrete positions and indicating the particular melting temperature of the portions of the first chemical associated with that position. Thus, an unknown temperature can be ascertained by reading the highest member of those indicia which correspond to discrete positions having the particular color.

In a preferred embodiment, a second chemical having a vivid color is disposed between the backing member and the first chemical. This vivid color becomes visible at each of the discrete positions associated with a translucent portion of the chemical to enhance the visual indication provided by the device.

The visual indication can be further enhanced by aligning the discrete positions in a single straight line from the lowest to highest melting temperatures. Since the vivid color will appear in all of the discrete positions below the particular temperature of the environment, the visual indication will appear as a stripe of the vivid color; furthermore, the stripe will terminate at the particular discrete position associated with the particular temperature. This will enable the particular temperature to be read directly at the end of the stripe.

It is particularly advantageous in a preferred embodiment that the first chemical has properties for maintaining the fluid, translucent characteristics in a first range of temperatures immediately below the melting point. Furthermore, this first range of temperatures includes the normal room temperatures. This feature enables the visual indication to be preserved at normal room temperature if a permanent record of the measured temperature is desired. These highly desirable characteristics are provided in many of the preferred embodiments by supercooled chemicals, such as sodium thiosulfate pentahydrate. The melting point of these supercooled chemicals can be incrementally depressed by the addition of water, sodium acetate, glycerin, urea, or other impurities to provide the different known melting points for each of the discrete positions. Although a single supercooled chemical is preferably used for the different temperatures, different supercooled chemicals each having an individual melting temperature can also be used.

It is also particularly advantageous that the supercooled chemicals have characteristics for being cooled below the first range of temperatures to solidify all of the portions of the first chemical to provide the opaque characteristics at each of the discrete positions. By recycling the first chemical in this manner, the device can be used subsequently to measure an additional temperature.

The present invention also includes a method for measuring at least one temperature. This method includes the step of viewing the particular color of a backing member through a first chemical having characteristics for becoming translucent at a known temperature. The method can also include the steps of cooling the first chemical to provide a permanent record of the measured temperature or alternatively cooling the first chemical to a second temperature to recycle the device.

It will be noted that with respect to the prior art which includes a three component system, the present invention can be embodied with a single chemical component providing a highly visible indication of a measured temperature. The device is particularly accurate and can be completely assembled far in advance of its intended use. A permanent record can be maintained of the measured temperature, or alternatively, the device can be recycled to subsequently measure an additional temperature.

These and other features and advantages of the present invention will become more apparent with a detailed description of the preferred embodiment taken in conjunction with the associated drawings.

DESCRIPTION OF THE DRAWINGS

FIG. 1 is a plan view of one embodiment of the temperature measuring device of the present invention;

FIG. 2 is a side elevational view of the embodiment illustrated in FIG. 1;

FIG. 3 is an end elevational view of the embodiment illustrated in FIG. 1;

FIG. 4 is a side elevational view of another embodiment of the device;

FIG. 5 is an end elevational view of the embodiment illustrated in FIG. 4;

FIG. 6 is a plan view of still a further embodiment of the device; and

FIG. 7 is a side elevational view of the embodiment illustrated in FIG. 6.

DESCRIPTION OF PREFERRED EMBODIMENTS

A device for measuring the temperature of an environment, such as the mouth of a patient, is shown generally in FIG. 1 and designated by the reference numeral 11. The device includes a high thermal conductivity backing member 13 for conducting heat to and providing support for a first chemical 15. A plurality of portions 17 of the first chemical 15, each having characteristics for becoming translucent in response to a particular different known temperature, can be disposed in respective discrete positions on the backing member 13. The backing member 13 can be printed or stamped or otherwise provided with a plurality of indicia 19 each disposed in proximity to an associated discrete position and corresponding to the different known temperatures of the portion 17 at the associated position.

With the first chemical 15 in a normally opaque state, the device 11 can be placed into a heated environment, such as the mouth of a patient, to determine its temperature. The heat of the environment will cause those portions 17 of the first chemical 15 associated with a particular temperature below the temperature of the environment to become translucent. In a preferred embodiment, the particular color associated with the backing material 13 is visible through the translucent portions 17 to provide a visual indication of temperature. By ascertaining the highest number of the indicia 19 corresponding to those discrete positions having the color of the backing member, the particular temperature of the environment can be ascertained.

In order for the heat of the environment to be conducted to the first chemical 15, it is particularly desirable that the backing member 13 have a high heat conductivity. Metals such as gold, silver, aluminum and copper are known to have this characteristic. A particular backing material may be chosen because it has a color which is easily distinguished from the color of the opaque first chemical 15. For example, in a preferred embodiment, a first chemical 15 which is generally white in its opaque state is advantageously disposed on a backing member 13 formed from a material having a copper color.

To enhance the visual indication provided by the translucence characteristics of the first chemical 15, a second chemical 21 preferably having a vivid color such as red, can be disposed between the backing member 13 and the first chemical 15. The second chemical 21 may be disposed over the entire backing member 13, one surface thereof, or merely beneath the portions 17 of the first chemical 15. As the portions 17 of the first chemical 15 become translucent in response to their respective particular temperatures, the vivid color of the second chemical 21 becomes visible. It can be appreciated that the second chemical 21 is particularly desirable in those embodiments wherein the color of the first chemical 15 in its opaque state is not particularly discernible against the color of the backing member 13. In an embodiment including the second chemical 21, the backing member 13 may be advantageously formed from aluminum which not only has a high heat conductivity, but it is also readily available and relatively inexpensive and nontoxic.

The first chemical 15 can be any chemical, compound, or combination thereof preferably having characteristics including opacity in a solid state and translucence in a liquid state. This combination of characteristics is desirable since the particular temperature at which the first chemical 15 becomes translucent will correspond to the melting temperature of the first chemical 15. Many of the supercoolable chemicals including sodium thiosulfate pentahydrate, sodium acetate trihydrate, calcium nitrate tetrahydrate, and ferric sulfate hexahydrate provide these characteristics.

In a preferred embodiment of the device 11, the first chemical 15 includes a particular eutectic compound formed from sodium thiosulfate pentahydrate and sodium acetate trihydrate. Individually, these chemicals have melting points of 118.4° F and 138.4° F, respectively; however, they can be combined in variable relative proportion in a eutectic compound to provide any melting point in the range between 107.6° F and 118.4° F. As disclosed in a copending application for a HEAT SOURCE PROVIDING A SUBSTANTIALLY CONSTANT TEMPERATURE, Ser. No. 375,332 assigned of record to the assignee of record of the present application, this eutectic compound is particularly stable in a liquid state below its melting point when it includes approximately 60 percent of the sodium thiosulfate pentahydrate and has a melting point of 107.6° F.

The melting point of the eutectic compound can be further depressed by the addition of increasing quantities of an impurity such as water, glycerin, or urea. To provide a different melting point for each of the portions 17, the melting point of the eutectic compound can be gradually depressed by increasing the percentage of the impurity in the first chemical 15. This percentage of the impurity is not directly proportional to the melting point of the first chemical 15. However, melting points in increments of two tenths of a degree Fahrenheit can be provided by those of ordinary skill in the art in accordance with known analytical procedures.

The temperature range between 95° and 105° F. is particularly desirable when the device 11 is to be used in conjunction with a human being having a normal temperature of 98.6° F. In such an embodiment of the device 11, the first chemical 15 can be divided into fifty-one of the portions 17 and the particular indicia 19 associated with each of the portions 17 can indicate the particular temperature in increments of 0.2° F within the preferred range. It will be apparent to those skilled in the art that the melting points of chemical other than those mentioned can also be gradually depressed to provide a visual indication of temperature.

The supercooled chemicals are also particularly advantageous for use as the first chemical 15 because of their ability to maintain a generally liquid state in a first range of temperatures below their melting point. The chemicals, such as sodium thiosulfate pentahydrate and sodium acetate trihydrate, are further desirable among the supercooled chemicals because this first range of temperatures, which may extend to 14° F, includes a normal room temperature such as 72° F.

In operating the device 11, these supercooled characteristics of the first chemical 15 enable the device 11 to provide a permanent record of the measured temperature. For example, if the temperature of the heated environment is 99.4° F, those portions 17 of the first chemical 15 corresponding to temperatures lower than 99.4° F will change to the liquid state and become translucent. Even after the device 11 is removed from the heated environment to a normal room temperature, such as the temperatures between 65° and 75° F, these portions 17 will remain in the liquid, translucent state and continue to provide a permanent visual indication of the 99.4° F. temperature. This is particularly important when the thermometer is used to take the temperature of a person. Furthermore, since the supercooled chemicals used in the thermometer are not dangerous to human beings, the thermometer can be disposed in a person's mouth, rectum, or armpit without any danger to such person.

Although these features of the device 11 which provide a permanent record can be particularly important, it may be desirable subsequently to use the device 11 to measure an additional temperature. In such a case, the supercooled chemicals are additionally desirable since they have properties making it possible alternatively to erase the measured temperature so that the device 11 can be reused. This recycling feature is associated with the properties of supercooled chemicals which provide for the cooling of the chemical 15 to a temperature below the first range of temperatures to freeze and thus solidify the first chemical 15. In the preferred embodiment wherein the first chemical 15 comprises the particular eutectic compound, this second range of temperatures includes a normal temperature for the freezing compartment of a refrigerator, such as 0° F. Thus, by merely placing the device 11 in a commonly available refrigerator, the first chemical 15 can be recycled to its solid, opaque state. In this manner, the device 11 can be repeatedly recycle so that it can be used to measure more than one temperature.

If the device 11 is to be recycled, it may be desirable to provide means for separating each of the portions 17, so that even in the liquid state the portions 17 maintain their incremented particular temperatures. As illustrated in FIGS. 6 and 7, a spacing member 23 can be constructed to define a discrete cavity or cell 25 for each of the portions 17. The spacing member 23 in a preferred embodiment is mounted on the backing member 13 and the portions 17 are disposed in the respective cells 25.

The spacing member 23 can be formed from any material which is nonreactive with the first chemical 15 or the backing member 13. Additionally, it may be desirable that the spacing member 23 have a particular vivid color to enhance the visual indication provided by the translucent portions 17. Alternatively, the second chemical 21 may be disposed beneath the portions 17 to provide the vivid color in each of the cells 25.

Although the portions 17 of the first chemical 15 can each be disposed in separate dots, it can be particularly advantageous to deposit the portions 17 along a straight line on the backing member 13 so that the associated melting temperatures of the portions 17 increase with progressive discrete positions along the line. This linear relationship of the portions 17 is particularly desirable because it further enhances the visual characteristics provided by the change of state of the first chemical 15. For example, only one of the translucent portions 17 will generally be disposed adjacent to an opaque portion 17 so that a line of demarcation 25 is defined between these two portions 17. It is particularly desirable that this line of demarcation 25 be easily distinguished because it is preferably disposed in nearest proximity to the particular indicia 19 which corresponds to the measured temperature. This line of demarcation 25 will be particularly evident in the preferred embodiment wherein the portions 17 are aligned, since the line 25 will separate all of the opaque portions 17 from all of the translucent portions 17. Thus, in this preferred embodiment, larger blocks of color define the line 25 so that the line 25 can be more easily associated with the particular indicia 19. Furthermore, if the portions 17 are aligned, the indicia 19 can also be aligned to facilitate the reading of the particular indicia 19.

To measure a particular temperature, the device 11 can be placed in an environment having the elevated temperature to be measured. This may be the mouth or rectum of a patient or may be the armpit of the patient. This will cause the portions 17 of the first chemical 15 to become translucent in all of the discrete positions associated with a particular known temperature of magnitude less than the temperature being measured. By viewing the particular color of the backing member 13 or the second chemical 21 through the translucent portions 17, the temperature being measured can be determind by ascertaining the highest of the known temperatures associated with a discrete position having the particular color.

The device 11 as described and discussed herein provides a quantum jump in the art associated with temperature measuring devices. The use of supercooled chemicals for the first chemical 15 enables the user to maintain a permanent record of the measured temperature even if the first chemical 15 is subsequently cooled to a temperature within the first range of temperatures. Alternatively, the device 11 can be recycled by cooling first chemical 15 to a temperature in the second range of temperatures so that the device 11 can be used subsequently to measure additional temperatures. Among the supercooled chemicals, the compound including sodium thiosulfate pentahydrate and sodium acetate trihydrate is particularly desirable since its visual characteristics change from opacity to translucence as its state changes from a solid to a liquid. Furthermore, these chemicals form a eutectic compound which can be combined with impurities to progressively depress the melting points of the portions 17. However, it will be appreciated that different supercooled fluids may be used to produce the individual temperatures.

Although the device 11 has been disclosed with reference to particular embodiments, it will be apparent to those skilled in the art that the device can be otherwise embodied within the scope of the invention which therefore should be ascertained only with reference to the following claims.

We claim:

1. A thermometer for measuring the temperature of an environment, including:
   a backing member;
   first means supported by the backing member at a plurality of discrete positions and having, at each of the discrete positions, individual properties responsive to heat in the environment for changing state at a different known temperature to provide a visual indication of the temperature of the environment in accordance with the number of discrete positions changing state, the first means having at each discrete position characteristics for changing from a solid to a liquid at the different known temperature and for thereafter continuing in the liquid state at temperatures below the different known temperature and further having characteristics of being converted to the solid form at particular temperatures considerably below the different known temperature and of thereafter becoming converted again to the liquid form at the different known temperature.

2. The thermometer recited in claim 1 wherein the first means has a different known melting temperature of sharply defined characteristics at each of the discrete positions and wherein all of the first means melts at the different known melting temperatures at the individual discrete positions.

3. The thermometer recited in claim 2 wherein the first means is opaque in the solid state and has properties of becoming translucent in the liquid state to provide a visual indication of the temperature being measured.

4. The thermometer set forth in claim 3 wherein the first means has characteristics for maintaining the visual indication of the temperature being measured at temperatures below such temperatures to provide a permanent record of the measured temperature and of thereafter remaining in the translucent state at temperatures below the temperature being measured until it becomes converted to a solid at the particular temperatures considerably below the temperature being measured.

5. The thermometer recited in claim 3 wherein the first means includes:
   a first chemical having characteristics of being converted from a solid to a liquid at a particular melting temperature and thereafter remaining in the liquid temperature until its temperature is reduced to the particular temperature; and
   a second chemical having characteristics for being combined with the first chemical in different relative proportions at each of the discrete positions to provide the first means at each of the discrete positions with a different known melting temperature at which the translucent characteristics of the first means occur, the second chemical having characteristics of retaining the first chemical in the liquid state at temperatures below the different melting temperature for the mixture of the first and second chemicals until the temperature of the mixture is reduced to the particular temperature.

6. The thermometer set forth in claim 5 wherein the first chemical includes sodium thiosulfate pentahydrate and sodium acetate trihydrate and the second chemical includes one of glycerin, water, urea, and sodium acetate pentahydrate.

7. The thermometer recited in claim 5 wherein the first means is disposed on a backing member in a plurality of discrete positions and the relative proportions of the first and second chemicals differ at each of the discrete positions to provide the first means with a different known melting temperature at each of the discrete positions and wherein means are provided between the backing member and the mixture of the first and second means to provide a background of a distinctive color when the mixture becomes converted from a solid to a liquid at the different known temperature for the discrete position.

8. The thermometer recited in claim 7 further comprising second means disposed between the first means and the backing member and defining a cell at each of the discrete positions whereby a portion of first means is disposed in each of the cells.

9. A thermometer for measuring a particular temperature, including:
   a backing member having a particular color;
   first supercoolable means disposed on the backing member in a plurality of discrete positions, the first means at each of the positions having characteristics for changing from a first visual state to a second visual state in response to a different known temperature for each of the positions to provide a visual indication of the particular temperature and having properties of remaining in the second visual state at temperatures below the different known temperature for each of the discrete positions and having properties of becoming reconverted to the first state at particular temperatures considerably below the different known temperatures to provide for the subsequent conversion of the first means again to the second state at the different known temperatures at the discrete positions.

10. The thermometer set forth in claim 9 wherein the first supercoolable means at the discrete positions has characteristics for remaining in the second visual state at all of the temperatures between the different known temperatures and the particular temperature.

11. The thermometer recited in claim 10 wherein all of the first supercoolable means has characteristics for becoming converted from the first state to the second state at the different known temperature for each discrete position.

12. The thermometer recited in claim 9 wherein the different known temperatures are the different melting temperatures of the first supercoolable means at each of the positions and the first supercoolable means is a solid in the first visual state and is a liquid in the second visual state.

13. The thermometer set forth in claim 9 wherein the first supercoolable means includes a eutectic compound.

14. The thermometer set forth in claim 12 further comprising second means included in the first supercoolable means in proportions which differ at each of the discrete positions to provide the first supercoolable means with a different melting point at each of the discrete positions and wherein the second means has characteristics which do not inhibit the retention of the first supercoolable means in the second visual state at temperatures below the different known temperatures for each discrete position.

15. In combination for measuring temperature,
a backing member;
first means disposed on the backing member at progressive positions along the backing member and having properties including a vivid color;
second means disposed on the side of the first means opposite that of the backing member at discrete and progressive positions along the backing member and having, at progressive positions along the backing member, characteristics for cooperating with the first means to inhibit the visual indication of the vivid color for temperatures below a progressive and individual value for each discrete and progressive position and to provide for a visual indication of the progressive and individual temperature at such progressive and discrete positions for temperatures being measured above such progressive and individual temperatures and to provide for the retention of such visual indication at temperatures subsequently below such progressive and individual temperatures at the progressive and discrete positions; and
the second means having characteristics including opacity in the solid state and translucence in the liquid state and the second means melts to the liquid state at the progressive and individual temperatures along the second means for temperatures being measured above such progressive and individual temperatures and continues thereafter in the liquid state at temperatures below the progressive and individual temperatures at the progressive and discrete positions.

16. The combination set forth in claim 15 wherein the second means is disposed on the first means at a plurality of discrete positions and all of the second means at each of the discrete positions melts at a precise and individual temperature to reveal the vivid color of the first means.

17. The combination recited in claim 16 wherein the second means comprises:

a first supercooled chemical having properties of being disposed in a solid state and of melting to a liquid at a particular temperature and of remaining as a liquid thereafter at temperatures below the particular temperature and of thereafter becoming reconverted to a solid at a temperature considerably below the melting temperature to thereafter become melted at the particular temperature; and
a second chemical mixed with the first chemical in different proportions at each of the discrete positions to provide the first means with a different known melting point at each of the discrete positions and further having properties of facilitating the retention of the first chemical in the liquid state at temperatures below the progressive and individual temperatures at the discrete positions after the conversion of the first means to the liquid state at the progressive and individual temperatures at the discrete positions.

18. A method of determining a temperature to be measured including the steps of:
providing a colored backing member having supercoolable chemical means disposed thereon in a plurality of discrete positions, the chemical means having characteristics at each of the discrete positions for becoming translucent at a known temperature different from each of the discrete positions and of thereafter remaining in the translucent state at temperatures below the known temperatures for the discrete positions and of becoming converted to an opaque state at a temperature considerably below the known temperatures for the discrete positions and of thereafter becoming converted to the translucent state at the known temperatures for the discrete positions;
subjecting the chemical means to the temperature to be measured to cause the chemical means to become translucent at each of the discrete positions having a known temperature at least equal to the temperature to be measured; and
determining the highest of the known temperatures at which the chemical means become translucent at the discrete positions.

19. The method recited in claim 18 wherein the known temperatures for the discrete positions are provided on the backing member at the discrete positions and wherein the determining step includes the step of viewing the known temperature of the backing member through the chemical means at each of the discrete positions in which the chemical means has been converted to the translucent state.

20. The method set forth in claim 19 wherein all of the chemical means at each discrete position becomes converted to the translucent state at the known temperature for such discrete position.

21. The method set forth in claim 20 wherein the chemical means includes a supercoolable fluid having characteristics of being in a solid, crystalline and opaque state at temperatures below the known temperature for each discrete position and of becoming converted to the liquid and translucent state at the known temperature for each discrete position and of thereafter remaining in the liquid and translucent state at temperatures below the known temperature for each discrete position and of subsequently becoming converted to the solid, crystalline and opaque state at the temperature considerably below the known temperature for each discrete position and of thereafter becoming converted to the liquid and translucent state at the known temperature for each discrete position.

22. The method set forth in claim 20 wherein the chemical means include a chemical used with the supercoolable fluid in different proportions to provide an individual and progressive known temperature for each of the discrete and progressive positions and wherein the chemical has characteristics of not inhibiting the characteristics of the supercoolable fluid of being converted from the solid to the liquid state and for thereafter remaining in the liquid state until the temperature of the chemical means has been reduced to the temperature for converting the chemical means to the solid state.

23. A thermometer for measuring a particular temperature, including:
a backing member having a particular color;
first supercoolable means disposed on the backing member in a plurality of discrete positions, the first means at each of the positions having characteristics for changing state in response to a different known temperature to provide a visual indication of the particular temperature; wherein
the different known temperatures are the different melting temperatures of the first means at each of the positions; and
the first supercoolable means comprises a eutectic compound including sodium thiosulfate pentahydrate and sodium acetate trihydrate.

24. A temperature measuring device including:
a backing member;
first means disposed on the backing member at progressive positions along the backing member and having properties including a vivid color;
second means disposed on the side of the first means opposite that of the backing member and having characteristics at the progressive positions along the backing member for cooperating with the first means to provide a visual indication of a progressive and individual temperature at such progressive positions, the second means having characteristics including opacity in the solid state and translucence in the liquid state and having characteristics for melting at each of the progressive positions at an individual temperature to reveal the vivid color of the first means;
a first chemical including sodium thiosulfate pentahydrate and sodium acetate trihydrate included in the second means and having properties for being supercooled; and
a second chemical mixed with the first chemical in different proportions at each of the discrete positions to provide the second means with a different known melting point at each of the progressive positions.

25. A temperature measuring device including:
a backing member;
first means disposed on the backing member at progressive positions along the backing member and having properties including a vivid color;
second means disposed on the side of the first means opposite that of the backing member and having characteristics at the progressive positions along the backing member for cooperating with the first means to provide a visual indication of a progressive and individual temperature at such progressive positions, the second means having characteristics including opacity in the solid state and translucence in the liquid state, and having characteristics for melting at each of the progressive positions at an individual temperature to reveal the vivid color of the first means;
a first chemical including sodium thiosulfate pentahydrate and sodium acetate trihydrate included in the second means and having properties for being supercooled; and
a second chemical including at least one of the impurities glycerine, water and urea, the second chemical being mixed with the first chemical in different proportions at each of the discrete positions to provide the second means with a different known melting point at each of the discrete positions.

26. A method for determining the temperature of an environment including the steps of:
providing a colored backing member having chemical means coated thereon in a plurality of discrete positions, the chemical means having characteristics at each of the discrete positions for becoming translucent at a temperature different for each of the discrete positions;
heating the chemical means to the temperature to be measured so that the chemical means becomes translucent at each of the discrete positions having a corresponding temperature lower than the temperature to be measured;
determining the highest temperature corresponding to a translucent chemical means;
during the determining step, viewing the color or the backing member through the chemical means at each of the discrete positions containing translucent chemical means;
cooling the chemical means to a temperature within a first range of temperatures to maintain a permanent record of the measured temperatures; and
cooling the device to a particular temperature below the first range of temperatures to provide the chemical means at each of the discrete positions with opaque characteristics prior to using the device to measure an additional temperature.

27. A method for determining the temperature of an environment including the steps of:
providing a colored backing member having chemical means coated thereon in a plurality of discrete positions, the chemical means having characteristics at each of the discrete positions for becoming translucent at a temperature different for each of the discrete positions;
heating the chemical means to the temperature to be measured so that the chemical means becomes translucent at each of the discrete positions having a corresponding temperature lower than the temperature to be measured;
determining the highest temperature corresponding to a translucent chemical means;
during the determining step viewing the color or the backing member through the chemical means at each of the discrete positions containing translucent chemical means;
cooling the chemical means to a temperature within a first range of temperatures to maintain a permanent record of the measured temperatures; and
cooling the device to a particular temperature of 0° F. below the first range of temperatures to provide the chemical means at each of the discrete positions with opaque characteristics prior to using the device to measure an additional temperature.

28. In combination for measuring a temperature, including:

a backing member;

first means disposed on the backing member in a plurality of discrete positions defining a first line on the backing member, the first means having first visual characteristics and properties for changing to second visual characteristics at a different temperature for each of the discrete positions, the different temperatures increasing progressively along the first line defined by the first means, the first means having properties responsive to the temperature to be measured to define a second line of demarcation between the discrete positions associated with the first means having the first visual characteristics and the discrete positions associated with the first means having the second visual characteristics, the line of demarcation providing an indication of the measured temperature, the first means having properties of retaining the second visual characteristics at temperatures below the different temperatures for the discrete positions after changing at the different temperatures for the discrete positions to provide the visual indications with the second characteristics and having properties of becoming reconverted to the first visual characteristics at temperatures considerably reduced below the particular temperatures to provide for a subsequent change of the first means from the first visual characteristics to the second visual characteristics at the different temperature for each of the discrete positions.

29. The combination recited in claim 28 further comprising a supercoolable chemical included in the first means and providing the first means with characteristics for maintaining the second line of demarcation to provide a permanent record of the measured temperature even at temperatures below the measured temperature and characteristics for alternatively recycling the first means to the first visual characteristic by converting the supercoolable chemical to the first visual characteristics at temperatures considerably below the measured temperature to facilitate the measuring of an additional temperature.

30. The combination set forth in claim 28 further comprising:

a spacing member disposed on the backing member and defining a cell for the first means at each of the discrete positions along the backing member; and the first means being disposed in the cells of the spacing member.

31. The combination set forth in claim 29 wherein a chemical is included in the first means in a different proportion with the supercoolable chemical at each of the discrete positions to provide for the change of the first means from the first visual characteristics to the second visual characteristics at the different temperature at each individual one of the discrete positions and the chemical is provided with characteristics to facilitate the retention of of the first means with the first visual characteristics at temperatures below the different temperatures for the individual ones of the discrete positions after the change of the first means to the second visual characteristics.

32. The combination set forth in claim 30 wherein the first means are in a solid, opaque state in the first visual characteristics and are in a liquid, translucent state in the second visual characteristics and wherein means are disposed between the backing member and the first means to provide the backing member with a distinctive visual appearance when the first means are in the liquid, translucent state.

* * * * *